Sept. 29, 1925.

G. H. PEAL 1,555,515

INDIVIDUAL COFFEE BREWER

Filed Dec. 30, 1922

INVENTOR
George H Peal
BY
ATTORNEY

Patented Sept. 29, 1925.

1,555,515

UNITED STATES PATENT OFFICE.

GEORGE H. PEAL, OF RUTHERFORD, NEW JERSEY.

INDIVIDUAL COFFEE BREWER.

Application filed December 30, 1922. Serial No. 609,989.

*To all whom it may concern:*

Be it known that I, GEORGE H. PEAL, a citizen of the United States, residing at Rutherford, in the county of Bergen and State of New Jersey, have invented certain new and useful Improvements in Individual Coffee Brewers, of which the following is a specification.

This invention relates to a coffee brewer.

An object of the invention is to provide a simple, cheap and efficient device suitable for containing a quantity of ground coffee and adapted to be suspended within a pot of boiling water, the device being perforated and being constructed to permit of adjustment of the size of the openings thru which the water may reach the coffee.

A further object is to so construct the device that it is expansible to suitably accommodate any expansion of the contained coffee.

A further object is to provide a suspension cord or wire connected with the device in a manner to maintain the device assembled.

A further and more detailed object is to construct the device of two separately formed and substantially identical cylindrical sections telescoped one within the other, said sections both being perforated and being movable relative to each other to bring the perforations of the two sections into and out of register at will and to permit of convenient increase in the interior area of the device upon occasion, the two sections being held together by a suitable cord or wire in such manner as not to interfere with the mentioned functions and said cord or wire having an extending part by which the device may be suspended within a pot of boiling water.

Other objects and aims of the invention, more or less specific than those referred to above, will be in part obvious and in part pointed out in the course of the following description of the elements, combinations, arrangements of parts and applications of principles, constituting the invention, and the scope of protection contemplated will be indicated in the appended claims.

In the accompanying drawings which are to be taken as a part of this specification, and in which I have shown merely a preferred form of embodiment of the invention:—

Figure 2:
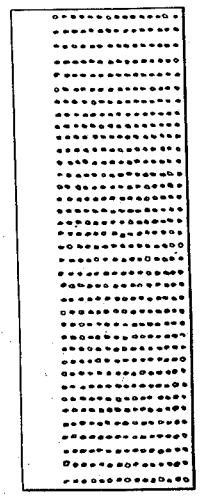
Figure 2 is a plan view of the blank employed for forming one of the sections of the brewer.
Figure 3:
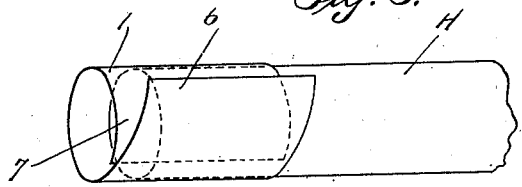
Figure 3 is a diagrammatic view illustrating the manner in which the blank is wrapped around a suitable mandrel in the process of forming one of the sections.
Figure 4:
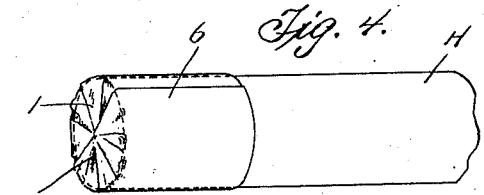
Figure 4 is a similar view illustrating the manner in which a portion of the blank is folded down over the end of the mandrel to complete the section.
Figure 5:
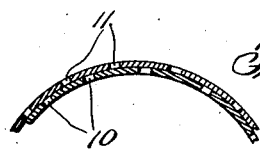
Figure 5 is an enlarged fragmentary view illustrating the manner in which the perforations of the two sections of the brewer are obstructed as when the brewer is not in use.

Referring to the drawings for describing in detail the structure therein illustrated the reference character L indicates one of the sections of the brewer while the reference character G illustrates the other section. These sections may be formed of any appropriate material but in practice it has been found that very thin sheet aluminum is an ideal material for the purpose. Each of the sections is formed from a perforated sheet as seen in Fig. 2, the sheet being first wrapped about a suitable die or mandrel H at a position so that a portion as 1 of the cylinder formed by the sheet projects beyond the end of the mandrel as seen in Fig. 3. The projecting portion 1 is then folded and creased down over the end of the mandrel as seen in Fig. 4. Ordinarily no other means is required for holding the section thus produced in its cylindrical form.

To produce the brewer two of these sections are employed and they are connected together by being telescoped one within the other. The inner section is of course first filled with the coffee as 2 before introduced into the outer section.

After the sections are assembled then a cord or wire 3 is passed axially thru the brewer, its opposite ends being brought around and being twisted together at one side of the brewer. A separate cord or wire 4 may be connected with the wire 3 for carrying an advertisement, or finger grip tag 5, or said cord or wire 4 may be made as an integral extension of the cord or wire 3 as illustrated.

The two sections employed for forming a single brewer may be formed upon mandrels of slightly different diameters if desired but it is found in practice that owing to the thinness of the sheet of material from which the sections are formed it is quite possible to use sections formed all upon a single size mandrel. In being assembled the inner section will compress slightly while the outer section will expand slightly. The manner in which the sections are constructed also facilitate this result, it being noted in this connection that the lapping parts as 6 and 7 of the sheet forming the section are not rigidly connected together in any way but are left free to move slightly relative to each other so that they thereby permit limited variation in the diameter of the section at any time after the section is formed.

Figure 1:
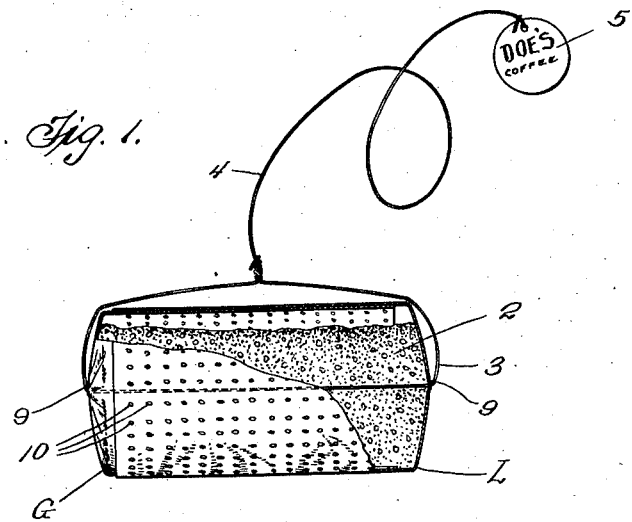
Figure 1 is a side elevational view of a brewer constructed in accordance with this invention, being partly broken away and shown in transverse section for the better disclosure of details.

It is noted further that the manner in which the closed ends or heads, as 8, of the sections are formed permits said heads to bow readily into either concaved or convexed shape. Preferably when the sections are originally formed these heads are slightly convexed substantially as seen in Fig. 1. When the cord or wire 3 is threaded thru the device and is bent around the sections as indicated it provides shoulder portions as 9 which obstruct free separating movement of the sections. Nevertheless since these shoulders occur centrally of the heads it follows that the two sections may be moved apart within appreciable limits while the heads are bent by the shoulders 9 from their original convexed shape to a concaved shape. Within these limits of movement the perforations 10 of one section may move into and out of register with the perforations 11 of the other section so that thus a user may readily cause any desired amount of free passage thru the sections to and from the coffee. This adaptability of the sections to be moved apart within the limits also avoids the possibility that expansion of the contained coffee while brewing might cause such crowding as to make the device inoperative.

By rotating the sections relative to each other also the user may bring the apertures 10 of one section into and out of register with the apertures of the other section for determining the amount of free passage thru the sections to and from the coffee, and this provision, in addition to the provision to the same end by moving the sections longitudinally of each other, enables the user to accomplish the object without tedious manipulation.

Due to the slight, but nevertheless sufficient inherent resiliency of the material of which the sections are formed, the compression or enlargement of one or both of said sections will of course operate, when the sections are telescoped together, to urge return of the sections to their normal size, and will thereby create a close frictional engagement of the sections one with the other, which is a feature of considerable value not only in that it serves to hold the members assembled and in any position to which they are manually moved but also in that it prevents the presence of any excessive air passages between the opposing walls and thereby renders the operation of bringing the perforations into and out of register more precise and efficient.

While the drawings herewith show the sheet of material employed to be perforated only in that part which forms the side walls of the sections yet it will be understood that if desired the perforations may be formed also in the portions of the sheet constituting the end wall or head of the section.

It is intended that brewers constructed in accordance with this invention may be manufactured and sold, with their coffee contents, as articles of manufacture for individual use and that having been once used they are to be discarded and not again used. The material employed in their manufacture is extremely cheap and is of such nature that having been once used it could not readily be refilled and used again.

While the device is intended primarily for use in the brewing of coffee nevertheless it will be understood that it may be as readily employed for numerous other materials as may suggest themselves according to the nature and structure of the device.

As many changes could be made in this construction without departing from the scope of the invention as defined in the following claims, it is intended that all matter contained in the above description or shown in the accompanying drawings, shall be interpreted as illustrative only and not in a limiting sense.

In some instances the member 3, when made of wire or the like, may be sufficiently stiff so that it will serve its intended functions without being extended entirely thru the brewer. In this case the portions of the wire extending along the ends and side of the brewer will operate, by their stiffness, to cause the ends of the wire, centrally of the heads of the sections to indent into or puncture thru the material of said heads and will maintain these ends in engagement with the heads for holding the sections assembled in the same manner as already described.

Having thus described my invention, what I claim as new and desire to secure by Letters Patent is:—

1. A device of the class described comprising a container made up of a pair of similar sections telescoped one within the other and adapted to contain between them a quantity of material to be brewed, said sections being perforated and being arranged to be moved telescopically relative to each other to alter the interior area of the device, together with a retaining member extending axially thru the device and having engagement with said sections to limit telescopic movement of the sections.

2. A device of the class described comprising a container made up of a pair of similar sections telescoped one within the other and adapted to contain between them a quantity of material to be brewed, said sections being perforated and being arranged to be moved telescopically relative to each other to alter the interior area of the device, together with a retaining member extending axially thru the device having its opposite end portions extending thru the end walls of said sections and along the side wall of said sections, and said end portions being connected together exteriorly of the device to thereby retain the sections against undesirable telescopic movement.

3. A device of the class described comprising a container made up of a pair of similar sections telescoped one within the other and adapted to contain between them a quantity of material to be brewed, said sections being perforated, and having a retaining member extending thru the device and having shoulder parts exteriorly of the device arranged to prevent separation of said sections.

4. A device of the class described comprising a container made up of a pair of similar sections telescoped one within the other and adapted to contain between them a quantity of material to be brewed, said sections being perforated and being cylindrical, and a retaining member extending axially thru the device having shoulder parts arranged to engage exterior surface portions of end walls of the section to retain the sections against separation while yet permitting rotary movement of the sections relative to each other.

5. A device of the class described comprising a container made up of a pair of similar sections telescoped one within the other and adapted to contain between them a quantity of material to be brewed, said sections being cylindrical and having convexed closure heads at their outer ends, and a connecting member extending axially thru the device and thru said closure heads having shoulders exteriorly of said heads disposed to obstruct separating movement of central portions of said heads, and the material of said heads being yieldable to permit them to move from their normal convexed shape toward a concaved shape to thereby facilitate limited separating movement of the sections.

6. A device of the class described comprising a container made up of a pair of similar sections telescoped one within the other and adapted to contain between them a quantity of material to be brewed, said sections being perforated and being arranged to be moved telescopically and rotatably relative to each other thereby to bring the perforations of the respective sections into and out of register with each other, the perforations in each section being spaced apart and said sections being in close contact with each other so that movement of said sections relative to each other will regulate the size of the passages through said sections.

7. A device of the class described comprising a container made up of a pair of sections telescoped one within the other and adapted to contain between them a quantity of material to be brewed, said sections being cylindrical and each having a closure head at its outer end, being formed from a single sheet of material bent into cylindrical form and end portions of the cylinders being folded together to thereby produce said closure heads and retain the sheet in cylindrical form.

8. A device of the class described comprising a container made up of a pair of similar sections telescoped one within the other and adapted to contain between them a quantity of material to be brewed, said sections being made of sheet metal having a plurality of spaced apertures therethrough, the telescoping portions of said sections being in sliding contact, and said sections being movable relative to each other for bringing the apertures of the two sections into and out of register with each other to thereby determine the amount of passage to and from the material within the device.

9. A device of the class described comprising a container made up of a pair of similar sections telescoped one within the other and adapted to contain between them a quantity of material to be brewed, said sections being made of sheet metal having a plurality of spaced apertures therethrough, the telescoping portions of said sections being in sliding contact, and said sections being rotatable relative to each other for bringing the apertures of the two sections into and out of register with each other to thereby determine the amount of passage to and from the material within the device.

10. A device of the class described comprising a container made up of a pair of similar cylindrical sections telescoped one within the other and adapted to contain between them a quantity of material to be brewed, said sections each being formed of sheet metal and being provided with a plurality of rows of perforations extending longitudinally thereof, the rows being spaced apart circumferentially of the sections, and said sections being arranged to be moved rotatably relative to each other to thereby bring the rows of perforations of one section into and out of register with the rows of the other section for the purpose set forth.

11. A device of the class described comprising a container made up of a pair of similar cylindrical sections telescoped one within the other and adapted to contain between them a quantity of material to be brewed, said sections each being formed of sheet metal and being provided with a plurality of rows of perforations extending circumferentially thereof the rows being spaced apart longitudinally of the sections, and said sections being arranged to be moved longitudinally relative to each other to thereby bring the rows of perforations of one section into and out of register with the rows of the other section for the purpose set forth.

12. A device of the class described comprising a container made up of a pair of similar cylindrical sections telescoped one within the other and adapted to contain between them a quantity of material to be brewed, said sections each being formed of sheet metal and being provided with a plurality of perforations, said perforations of each section being arranged so that they stand in rows spaced apart and extending both longitudinally and circumferentially of the sections, and said sections being arranged to be moved longitudinally and rotatably relative to each other whereby both to alter the capacity of the container and to bring the rows of perforations of one section into and out of register with the rows of the other section for the purpose set forth.

13. In a device of the class described, a pair of separately formed members each being of substantially identical size and shape, each of said members being formed from a single piece of perforated sheet metal bent into cylindrical form closed at one end and open at the opposite end, at least one of said members being resiliently circumferentially yieldable whereby its diameter may be altered, and said yieldable member being made to yield and being placed in telescoping frictional engagement with the other member to thereby complete a container for the material to be brewed, said members being rotatable relative to each other for bringing the perforations thereof into and out of register and the resiliency of the yieldable member serving to hold the juxtaposed perforated portions of the two members in close engagement during such rotation.

In testimony whereof I affix my signature.

GEORGE H. PEAL.